United States Patent [19]

Porel

[11] Patent Number: 5,067,753
[45] Date of Patent: Nov. 26, 1991

[54] HYDROSTATICALLY BALANCED ROTARY HYDRAULIC CONNECTOR

[76] Inventor: Louis C. Porel, rue de Moulins, Jeanmenil 88700 Rambervillers, France

[21] Appl. No.: 525,749

[22] Filed: May 18, 1990

[30] Foreign Application Priority Data

May 31, 1989 [FR] France .............................. 8907168

[51] Int. Cl.$^5$ ..................... F16L 27/00; F01B 9/00; F04B 1/00
[52] U.S. Cl. .................................... 285/279; 285/11; 285/276; 285/280; 285/98; 285/94; 285/14; 277/5; 384/111; 384/118
[58] Field of Search .................... 285/94, 95, 98, 279, 285/11, 276, 267, 268, 281, 375, 14, 178, 900, 334.4; 277/5, 6, 8; 384/111, 118

[56] References Cited

U.S. PATENT DOCUMENTS 4,792,164 12/1988 Suemitsu ..................... 285/279 X

FOREIGN PATENT DOCUMENTS 2540240 9/1977 Fed. Rep. of Germany .............. 1/1
0949644 9/1949 France ................................ 285/276
2041468 1/1971 France .

Primary Examiner—Peter M. Cuomo
Assistant Examiner—Tim Aberle
Attorney, Agent, or Firm—Darby & Darby

[57] ABSTRACT

The fluid-tight coupling is designed for connecting a fixed hydraulic line with a rotary hydraulic line. The fixed line (1) carries on its end an axially movable tubular piston (7) provided with a hemispherical head (8); the rotary line (2) has an offset end portion (15), the axis (Y) of which is eccentric with respect to the axes (X) and (Z) of the pipes (1) and (2), this end portion (15) being also provided with a hemispherical head (16); between the two hemispherical heads (8, 16) is interposed a wobbling rotary core piece (17) formed with a central orifice (18) and with two opposed concave conical bearing surfaces for fluid-tight engagement with both hemispherical heads (8, 16) respectively. In a preferred embodiment, the axial thrust exerted on the hemispherical head (16) corresponding to the rotary pipe (2) is supported by a hydrostatic bearing (24, 25) and the rotary pipe (2) is also supported by a hydrostatic bearing (22).

11 Claims, 2 Drawing Sheets

HYDROSTATICALLY BALANCED ROTARY HYDRAULIC CONNECTOR

FIELD OF THE INVENTION

This invention relates to the field of rotary hydraulic joints through which one hydraulic pipe supplied with high-pressure liquid may be connected to another pipe which is revolving about its longitudinal axis. This kind of connection between a fixed pipe and a rotary pipe raises very difficult problems as to fluid-tightness and balancing, to such an extent that it can be said that there does not exist on the market any really satisfactory device for this kind of connection.

PRIOR ART

In French Patent N° 2 041 468 in the name of the present Applicant, there is described a hydraulic pump of the slanted disc type, wherein the liquid tightness between revolving parts and fixed parts is provided by the interposition of a biconcave conical core piece between two hemispherical elements.

The present invention is concerned with the application of this kind of arrangement to the specific problem of the connection of two hydraulic pipes, one of which is fixed and the other is rotating.

SUMMARY OF THE INVENTION

This invention relates to a connecting device for joining a fixed hydraulic pipe with another hydraulic pipe which rotates about its longitudinal axis, characterized in that the fixed pipe comprises on its end a movable piston provided with a hemispherical head, while the rotary pipe comprises a terminal portion having its longitudinal axis in eccentric parallel position relative to the axis of said rotary pipe, said terminal member being also provided with a hemispherical head, and a rotary core piece formed with two opposed concave tapered bearing surfaces being interposed between the two hemispherical heads.

According to a first embodiment of the invention, the rotary pipe is supported in one or several bearings, either plain bearings or ball bearings.

According to a second embodiment, the rotary pipe is provided with a flange which bears against a support through a hydrostatic bearing.

BRIEF DESCRIPTION OF THE DRAWINGS

By way of example and for an easier understanding of the invention, there is represented the appended drawings in which.

DETAILED DESCRIPTION OF THE INVENTION

Figure 1:
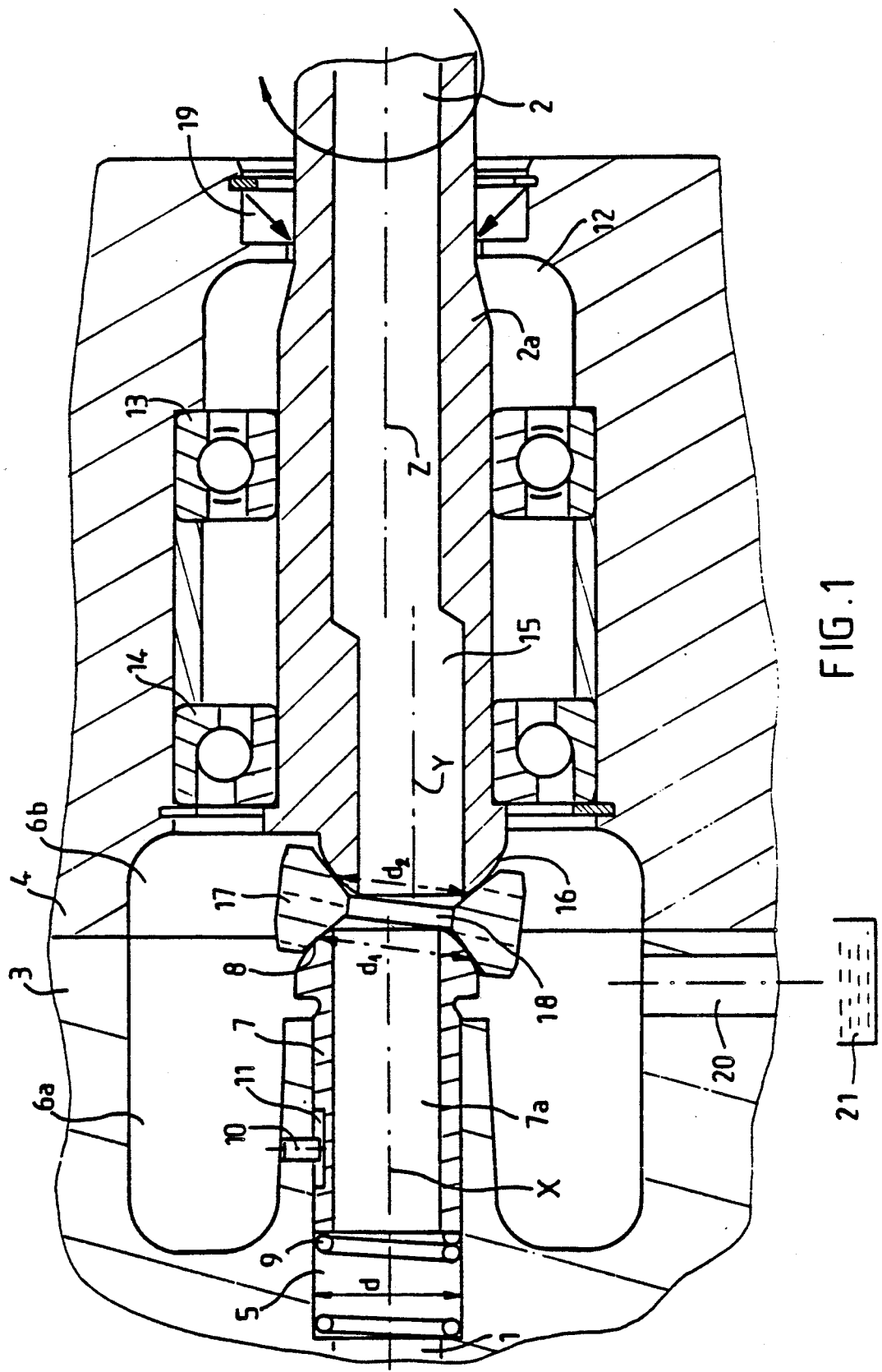
FIG. 1 is a diagrammatic view, in longitudinal cross-section, of a first embodiment of the invention.

Referring to FIG. 1, it can be seen that the hydraulic connector device according to this invention is designed for connecting a fixed hydraulic line 1 with a rotary hydraulic line 2. The fixed pipe 1 is inserted in a housing member 3, while the rotary line 2 is inserted in a housing member 4, the housing members 3 and 4 being fixed together by any suitable mechanical means which are not shown, since they do not form part of the present invention.

The fixed pipe 1 opens into a bore 5 formed in the housing member 3, which bore 5 in turn opens into a peripheral chamber 6a formed around said bore 5 in said housing member 3.

A hollow piston 7 provided with a hemispherical head 8 is slidable in said bore 5. The piston 7 is biased by a spring 9 and is provided with means for preventing it from rotating about its longitudinal axis, this retaining means being, for example, a lug 10 which engages a longitudinal groove 11 formed in one side of the piston.

The rotary pipe 2 comprises an end portion 2a which has a larger outer diameter than the pipe 2 and which is coaxial therewith, meaning that the axis of this widened end portion 2a is the same as the axis Z of pipe 2. This end portion 2a is supported by two bearings 13 and 14 which are lodged in a chamber 12 formed in the housing member 4. Inside the thickened end portion 2a, the pipe 2 is deflected, which means that it comprises an offset portion 15, the axis Y of which is offset relatively to the axis Z of pipe 2, in parallel therewith. On the end of this offset portion 15 of pipe 2 is provided a hemispherical head 16, the center of which is located on axis Y. As a result, the hemispherical head 16 is offset relative to the hemispherical head 8 of the piston 7, as will clearly be apparent from FIG. 1.

Between the spherical heads 8 and 16, there is disposed a core piece 17 having two opposed concave conical surfaces and having a central aperture 18, the diameter of which is substantially equal to the internal diameter of the tubular portion 15 and of the internal bore 7a of the piston 7. As represented in FIG. 1, the spherical head 16 on the end of tubular portion 15 projects into a chamber 6b formed in the housing member 4, this chamber 6b being the continuation of chamber 6a of the housing member 3.

When the diameter of the circle of contact of the hemispherical head 8 with a face of the biconical core piece 17 is designated as d1 while the diameter of the circle of contact of the hemispherical head 16 with the other face of this core piece 17 is designated as d2, the dimensions of these contacting parts are preferably determined so that d1=d2. If, on another hand, the diameter of the bore 5 is designated as d, it is necessary for d to be equal to or slightly larger than d1 and d2; as a result, if the incoming hydraulic pressure fed through the fixed pipe 1 is designated as P, while the area of the circle having d as its diameter is designated as S, the area of the circle having d1 as its diameter being S1 and the area of the circle having d2 as its diameter being designated as S2, there is obtained, on the first hand, the relationships :

$$P \times S > P \times S1 \text{ and } P \times S1 = P \times S2$$

The outcome is that the biconical core piece 17 is hydrostatically balanced and that it is maintained against the hemispherical heads 8 and 16 merely, practically, by the force of the spring 9, while the back-up force resulting from the hydraulic pressure is only a small one.

On another hand, as a result of the shift between the axis X of the bore 5 and the axis Y of the offset tubular portion 15, the core piece 17 is continually driven in a rotating movement about its own axis when the rotary pipe 2 is itself caused to rotate.

As represented in the drawing, the recess 12 in which the bearings 13 and 14 are mounted is in communication with the chamber 6 formed by the two chambers 6a and 6b, this chamber 6 being connected to a tank 21 via a duct 20. The duct 20 has the purpose of collecting the hydraulic fluid which may leak through the contact surfaces between the hemispherical heads 8 and 16 and the biconical core piece 17, so that it is not subjected to the hydraulic pressure. Fluid-tightness of the rotary pipe 2 is ensured by a gasket 19 which is provided for the sole purpose of fluid-tightness and does not have, practically, to sustain any hydraulic pressure, because leaks are drained out through the duct 20. The device shown in FIG. 1 is therefore constituting a rotary joint capable of ensuring a fluid-tight junction between a fixed hydraulic pipe 1 and a rotary hydraulic pipe 2.

It has been found, however, that while this arrangement ensures a good fluid tightness between the two pipes, it is not fully satisfactory because it is not properly balanced. D In fact, if the diameter of the bore 5 is taken as 27 mm, the cross-sectional area of this bore is 5.72 square centimeters U which represents, under a pressure of 400 bar (=5,800 psi), a thrust of approximately 2.3 tons on the hemispherical head 16, while this thrust has to be supported by the ball bearings 13 and 14. As a result, these ball bearings 13 and 14 run the risk of becoming damaged in a short time.

Figure 2:
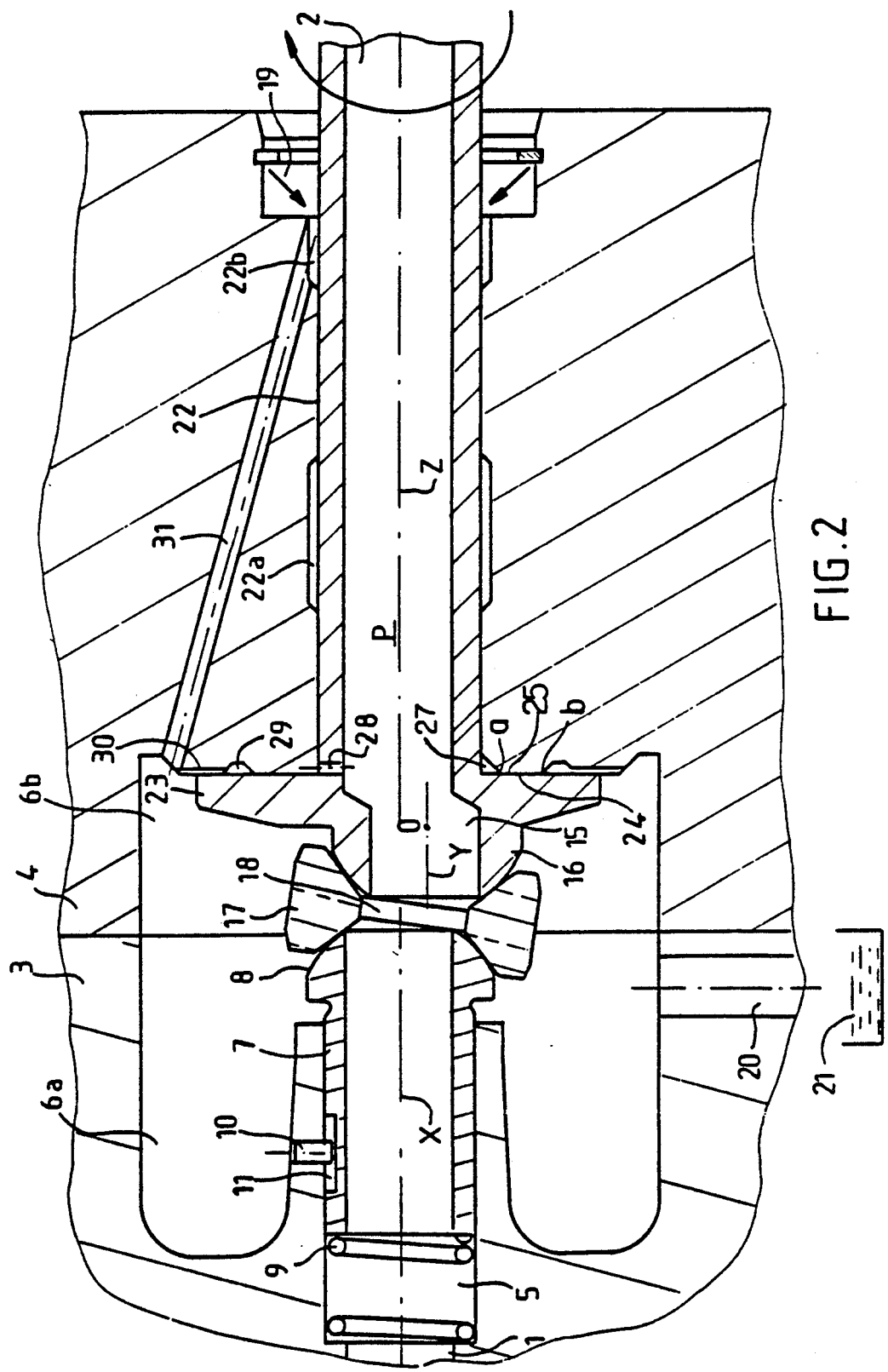
FIG. 2 is a diagrammatic view, in longitudinal cross-section, of a second embodiment of the invention.

FIG. 2 represents a modified embodiment of the hydraulic connection device of FIG. 1, in which the strains are compensated by a hydrostatic bearing. In this FIG. 2, the elements which are the same as those shown in FIG. 1 carry the same reference numerals.

As will be apparent from FIG. 2, the rotary pipe 2 is disposed inside a bore 22 which opens directly into the chamber 6b, while the pipe 2 has, in the same manner as in the previous example, an extension formed of a tubular member 15, the axis Y of which is eccentric relative to the axis Z of pipe 2. Pipe 2 further comprises a flange 23, integral with said pipe 2 and with the hemispherical head 16, this flange 23 being centered about the axis Z of pipe 2. The rear side 24 of the flange 23 is planar, perpendicular to the axis Z, and it rests against the planar face 25 which constitutes the end wall of the chamber 6b, this face 25 being also perpendicular to the Z axis. The bore 22 opens into the chamber 6b with a bevelled edge 27 and the space defined by this bevelled edge is brought into communication with the pressurized hydraulic fluid present in the rotary pipe 2 through an orifice 28 formed in the wall of pipe 2.

On another hand, the planar face 25 against which the planar face 24 of the flange 23 is resting includes a circular groove 29 which lies in communication with chamber 6b through one or several spaces 30. If the junction between the bevelled edge 27 and the planar face 25 is designated as "a" and if the edge of the circular groove 29 is designated as "b", there is provided between point "a" and point "b" a very small clearance separating the faces 24 and 25 so that an oil film may seep in between said faces 24 and 25, the pressure of this oil film being equal to P at point "a" and practically nil at point "b". It will then be sufficient to determine the size of this clearance so as that the sum of the forces developed by the pressure from "a" to "b" becomes equal or substantially equal to P×S. There is thus obtained a hydrostatic balancing of pipe 2 within its housing member 4. It is then no longer necessary to provide ball bearings such as the ball bearings 13 and 14 of FIG. 1, and if such bearings are however provided, they will not be subjected to a thrust force.

Preferably, there is provided between the bore 22 and the rotary pipe 2 a small gap into which may seep in some hydraulic liquid coming through the orifice 28. The liquid penetrating into this gap is collected in one or several annular grooves 22a and/or 22b, and liquid leaking through these grooves is gathered by ducts such as 31. Hence, the rotary pipe 2 also is then supported by a hydrostatic bearing.

I claim:

1. A fluid-tight connecting device for connecting a fixed hydraulic pipe with a rotary hydraulic pipe, wherein the fixed pipe (1) has a longitudinal axis X and a tubular piston (7) at its end which is axially movable in said fixed pipe (1) and prevented from rotating, said piston (7) being provided with a hemispherical head (8) and having a bore extending therethrough, while the rotary pipe (2) has a longitudinal axis Z and a terminal portion (15) provided with a hemispherical head (16), a rotary core piece (17) having a central aperture (18) being interposed between said hemispherical heads, said core piece (17) being formed with two opposed concave conical bearing surfaces for substantially fluid-tight engagement with said hemispherical heads (8, 16) respectively characterized in that the terminal portion (15) has a longitudinal axis (Y) that is parallel to and offset from the respective axes (X) and (Z) of the pipes (1) and (2), said hemispherical head of said terminal portion being laterally offset from said hemispherical head of said piston and the core piece (17) adjusts to compensate therefor.

2. A connecting device according to claim 1, wherein contact circles between the two hemispherical heads (8, 16) and the two faces of the core piece (17) have equal diameters (d1, d2), an external diameter (d) of the piston (7) carrying the hemispherical head (8) being equal to or slightly larger than the diameters of said contact circles (d1, d2).

3. A connecting device according to claim 1 wherein an axial thrust exerted on the hemispherical head (16) of the rotary pipe by the piston (7) is supported by one or several ball bearings (13, 14) arranged in a housing member (4) which supports the rotary pipe (2).

4. A connecting device according to claim 1 wherein an axial thrust exerted on the hemispherical head (16) of the rotary pipe by the piston (7) is supported by a hydrostatic bearing.

5. A connecting device according to claim 2, wherein an axial thrust exerted on the hemispherical head (16) by the piston (7) is supported by one or several ball bearings (13, 14) arranged in a housing member (4) which supports the rotary pipe (2).

6. A connecting device according to claim 2, wherein an axial thrust exerted on the hemispherical head (16) by the piston (7) is supported by a hydrostatic bearing.

7. A connecting device according to claim 4, wherein the hydrostatic bearing is constituted by a flange (23) having its center on the axis (Z) of a rotary pipe (2), the rear face (24) of said flange being perpendicular to said axis (Z) and resting against a rear wall (25) of a chamber (6b) formed inside a housing member (4) which supports said rotary pipe (2), said rear wall (25) being also perpendicular to said axis (Z), means being provided for allowing pressurized hydraulic fluid to seep in between the faces (24) and (25) so as to form a liquid bearing film.

8. A connecting device according to claim 7, wherein the width of the liquid bearing, as measured from a point 37 a" where the oil film is at its maximum pressure to a point "b" where the oil pressure is nil, is determined so that the sum of the forces caused by the pressure prevailing from "a" to "b" will be equal or substantially equal to the force exerted by the hemispherical head (8) against the core piece (17).

9. A connecting device according to claim 7, wherein the rotary pipe (2) itself is supported by a fluid bearing constituted by an oil film provided in the housing member (4) which supports the rotary pipe (2), said rotary pipe (2) being fitted in said bore (22), circular grooves (22a, 22b) being provided in said interstice and at least one of said grooves being drained toward the chamber (6b) through a duct (31).

10. A connecting device according to claim 8, wherein the maximum pressure is delivered to the point "a" through an orifice (28) communicating with the rotary pipe (2), while the point "b" corresponds to a circular groove (29) opening into the chamber (6b), said chamber being connected to a tank (21) by a draining pipe (20).

11. A connecting device according to claim 10, wherein the rotary pipe (2) itself is supported by a fluid bearing constituted by an oil film provided in an interstice formed between a bore (22) provided in the housing member (4) which supports the rotary pipe (2), said rotary pipe (2) being fitted in said bore (22), circular grooves (22a, 22b) being provided in said interstice and at least one of said grooves being drained toward the chamber (6b) through a duct (31).

* * * * *